US012430291B2

United States Patent
Chen et al.

(10) Patent No.: US 12,430,291 B2
(45) Date of Patent: Sep. 30, 2025

(54) DIRECTORY MANAGEMENT METHOD AND SYSTEM FOR FILE SYSTEM BASED ON CUCKOO HASH AND STORAGE MEDIUM

(71) Applicant: SUN YAT-SEN UNIVERSITY, Guangdong (CN)

(72) Inventors: Zhiguang Chen, Guangdong (CN); Xianqi Zheng, Guangdong (CN); Yutong Lu, Guangdong (CN); Nong Xiao, Guangdong (CN); Zejie Hu, Guangdong (CN); Jiawen Luo, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 20 days.

(21) Appl. No.: 18/039,967

(22) PCT Filed: Apr. 25, 2021

(86) PCT No.: PCT/CN2021/089531
§ 371 (c)(1),
(2) Date: Jun. 2, 2023

(87) PCT Pub. No.: WO2022/205544
PCT Pub. Date: Oct. 6, 2022

(65) Prior Publication Data
US 2024/0028560 A1    Jan. 25, 2024

(30) Foreign Application Priority Data
Apr. 1, 2021  (CN) .................. 202110356654.8

(51) Int. Cl.
G06F 16/13   (2019.01)
G06F 16/11   (2019.01)
G06F 16/14   (2019.01)

(52) U.S. Cl.
CPC .......... *G06F 16/137* (2019.01); *G06F 16/119* (2019.01); *G06F 16/152* (2019.01)

(58) Field of Classification Search
None
See application file for complete search history.

(56) References Cited

U.S. PATENT DOCUMENTS

| | | | |
|---|---|---|---|
| 8,954,673 B1* | 2/2015 | Natanzon | G06F 12/1018 714/52 |
| 11,593,270 B1* | 2/2023 | Brooker | G06F 11/1092 |

(Continued)

FOREIGN PATENT DOCUMENTS

CN    103064906    4/2013

OTHER PUBLICATIONS

Guoqiang He, "Data Integrity Check of PDM File System In Private Cloud Environment", Thesis of Master Degree, Shenyang Aerospace University, Mar. 2016, pp. 1-58.

(Continued)

*Primary Examiner* — Thu N Nguyen
(74) *Attorney, Agent, or Firm* — JCIPRNET (57) ABSTRACT

A directory management method and system for a file system based on Cuckoo hash are provided, including the steps of reading metadata of a sub-directory or a sub-file, used as a target file, in a directory: receiving a request for reading the target file in the directory; for the target file, determining an $i^{th}$ candidate data block, in a hash table of the directory according to a hash calculation result obtained by performing hash calculation on a filename filename of the target file according to an $i^{th}$ hash function of Cuckoo hash iteratively; if the filename filename of the target file exists in the $i^{th}$ candidate data block, reading metadata of the target file and returning the metadata, and ending the process;

(Continued)

otherwise, continuing to iterate until the iteration ends and returning a message that the target file does not exist.

5 Claims, 7 Drawing Sheets

(56) References Cited

U.S. PATENT DOCUMENTS

| | | | |
|---|---|---|---|
| 2005/0143171 A1* | 6/2005 | Loose | G06F 21/52 |
| | | | 463/29 |
| 2015/0052309 A1* | 2/2015 | Philip | G06F 12/082 |
| | | | 711/128 |
| 2016/0283498 A1* | 9/2016 | Beaverson | G06F 16/9017 |
| 2017/0212690 A1* | 7/2017 | Babu | G06F 3/0685 |
| 2018/0032540 A1 | 2/2018 | Geldman et al. | |
| 2020/0074075 A1* | 3/2020 | Yasukawa | G06F 21/51 |
| 2020/0134100 A1 | 4/2020 | Wils | |
| 2021/0081401 A1* | 3/2021 | Khatami | G06F 16/2379 |

OTHER PUBLICATIONS

"International Search Report (Form PCT/ISA/210) of PCT/CN2021/089531," mailed on Jan. 10, 2022, with English translation thereof, pp. 1-6.

* cited by examiner

DIRECTORY MANAGEMENT METHOD AND SYSTEM FOR FILE SYSTEM BASED ON CUCKOO HASH AND STORAGE MEDIUM

CROSS-REFERENCE TO RELATED APPLICATION

The application is a 371 of international application of PCT application serial no. PCT/CN2021/089531, filed on Apr. 25, 2021, which and claims priority to Chinese Patent Application No. 202110356654.8, entitled "Directory Management Method and System for File System Based on Cuckoo Hash", filed on Apr. 1, 2021, which is incorporated herein by reference in its entirety, as one part of the application.

BACKGROUND

Technical Field

The disclosure relates to computer information storage techniques, in particular to a directory management method and system for a file system based on Cuckoo hash.

Description of Related Art

Figure 1:
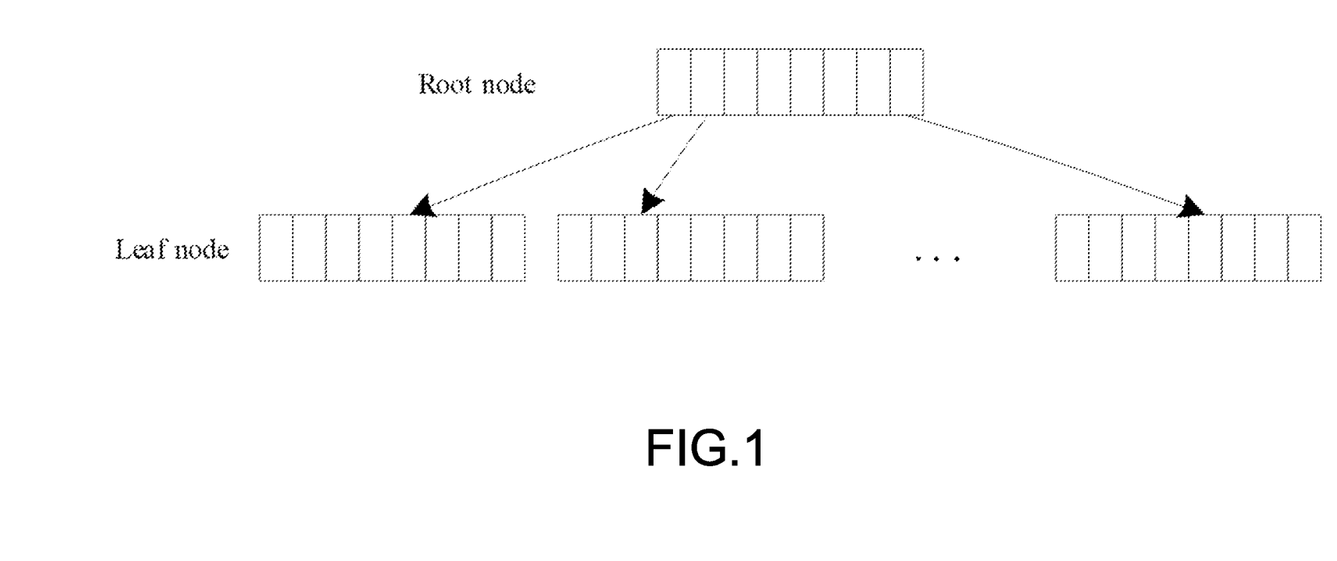
FIG. 1 is a schematic diagram of the HTree structure adopted by an EXT file system in the existing art.

The file system is a common data organization method, and most data of all industries is saved in various file systems at present. With the continuous increase of the data size, the scale of the file systems becomes increasingly larger, and each directory includes more and more sub-files or sub-directories, so a large delay will be introduced when a specific file in a large directory is searched for. The problem of large directories has become a great challenge for designing high-performance file systems. At present, the file system creates indexes for all sub-directories or sub-files in each directory by means of a complex data structure to ensure that a corresponding file can be found through the index structure when the file is accessed. For example, the well-known EXT file system creates indexes for sub-directories or sub-file in each directory by means of the HTree structure. As shown in FIG. 1, HTree is a two-stage tree structure, wherein the first stage includes a root node, and the second stage includes leaf nodes; and a large number of entries are saved in each node, and these entries are well-organized; and each entry in the leaf nodes corresponds to one sub-directory or sub-file. To insert a sub-directory or sub-file into the Htree, a corresponding hash value is calculated first by means of a hash function according to the filename. Because entries in the nodes are sorted according to hash values, entries in the root node can be searched for by dichotomy, and are then directed to the correct leaf node. Entries in the leaf nodes are also sorted according to hash values, so the entry corresponding to the file to be inserted is inserted into the correct position of the corresponding leaf node. Similarly, BtrFS creates one index for each directory by means of B+tree. Different from the EXT file system, BtrFS poses no limitation to the depth of B+tree, thus having better extendibility than the two-stage HTree. IndexFS creates indexes by means of GIGA+, which is also a tree structure in nature and has better splitting performance.

The EXT, BtrFS and IndexFS file systems create indexes for sub-directories or sub-files in each directory by means of a hierarchical tree structure. When an application accesses one file in a large directory, a large access delay will be caused inevitably for the following reasons: in the tree structure, a target object is searched for from the root node to the leaf nodes, that is, a path from the root node to the leaf nodes needs to be found, concurrent operations are not available in this process, analysis is performed layer by layer from the root node to the corresponding leaf node, and each layer of analysis involves a large amount of data reading, writing and calculation, leading to a large delay. Taking Htree adopted by the EXT file system as an example, to search out a file from HTree, the root node is read from a storage device first and then binary search is carried out; after a target leaf node is determined, the target leaf node is read from the storage device; then, binary search is carried out again, and this process involves two non-concurrent reading operations. Similarly, to search out a file from the B+tree of the BtrFS system, search is carried out from the root node of the B+tree to the target leaf node layer by layer, each search involves at least one reading operations and corresponding calculation and analysis, and the operations of each layer cannot be performed concurrently. With the increase of the total number of sub-files or sub-directories in each directory, the depth of the B+tree increases constantly, and the search delay of files in the B+tree will increase correspondingly. To sum up, a large delay will be introduced to the critical file access path when the tree structure is used for creating indexes for large directories.

SUMMARY

Technical problem to be solved by the disclosure: to solve the problem that the tree structure adopted by existing file systems to create indexes for large directories does not support concurrent processing, which is the main cause of a file access delay, the invention provides a directory management method and system for a file system based on Cuckoo hash, which creates indexes for sub-directories or sub-files in each directory by means of a hash table, which is a planar data structure and suitable for concurrent processing, such that a delay introduced to the critical file access path is small, concurrent operations can be realized, and data access of an application to a large directory can be remarkably accelerated.

To solve the above problem, the disclosure provides following technical solution:

A directory management method for a file system based on Cuckoo hash, including the steps of reading metadata of a sub-directory or a sub-file, used as a target file, in a directory:

(1) receiving a request for reading the target file in the directory;

(2) reading candidate data blocks corresponding to num hash functions of Cuckoo hash for the target file;

(3) initializing the value of a loop variable i to 1;

(4) for the target file, determining a target position, corresponding to an $i^{th}$ candidate data block, in a hash table of the directory according to a hash calculation result obtained by performing hash calculation on a filename filename of the target file according to an $i^{th}$ hash function of Cuckoo hash; determining whether a matching hash calculation result exists at the target position; if so, directly reading metadata of the target file from the target position and returning the metadata, and ending the process; otherwise, increasing the value of the loop variable i by 1; if the value of the loop variable i is greater than the total number num of the hash functions, performing the next step; otherwise, performing Step (4); and (5) returning a message indicating that the target file is non-existent, and ending the process.

Optionally, reading candidate data blocks corresponding to num hash functions of Cuckoo hash for the target file in step (2) includes: determining a first candidate data block corresponding to the hash table of the directory according to a hash calculation result obtained by performing hash calculation on the filename filename of the target file according to a first hash function of Cuckoo hash, and with the first candidate data block as an initial address, successively reading N candidate data blocks that include the candidate data blocks corresponding to the num hash functions of Cuckoo hash at a time, wherein N is the number of candidate data blocks successively read at a time.

Optionally, in the num hash functions of Cuckoo hash, a calculation function expression of the first hash function is $h(x)=hash(x)$, where hash is a preset hash value calculation function, and x is the filename filename of the target file; a calculation function expression of the $i^{th}$ hash function is:

$$h_i(x)=h_{i-1}(x)+\text{neatest\_prime}(h(x)\%N)$$

where, $h_i(x)$ denotes a hash calculation result of the $i^{th}$ hash function, $h_{i-1}(x)$ denotes a hash calculation result of the (i−1)th hash function, neatest_prime(h(x)%N) denotes the calculation of a maximum prime number less than h(x)%N, h(x) is a calculation result of the first hash function, % denotes a modulo operation, and N is the number of candidate data blocks successively read at a time.

Optionally, the directory management method for a file system based on Cuckoo hash further includes the steps of creating a sub-directory or a sub-file, used as target file, in a directory:

(S1) receiving a request for creating the target file;
(S2) reading candidate data blocks corresponding to num hash functions of Cuckoo hash for the target file;
(S3) initializing the value of a loop variable i to 1;
(S4) for the target file, determining a target position, corresponding to an $i^{th}$ candidate data block, in a hash table of the directory according to a hash calculation result obtained by performing hash calculation on a filename filename of the target file according to an $i^{th}$ hash function of Cuckoo hash; if the target position is vacant, writing metadata information of the target file and the hash calculation result to the vacant position, and ending the process; otherwise, increasing the value of the loop variable i by 1; if the value of the loop variable i is greater than the total number num of the hash functions, performing step (S5); otherwise, performing step (S4); and
(S5) triggering a migration to migrate the migration file at the position, corresponding to the $(i-1)^{th}$ candidate data block, in the hash table to form a vacant position, and writing metadata information of the target file and the hash calculation result to the vacant position.

Optionally, migrating the migration file at the position, corresponding to the $(i-1)^{th}$ candidate data block, in the hash table in step (S5) comprises:

(S5.1) for the migration file, determining whether the candidate data blocks corresponding to the num hash functions of Cuckoo hash read for the target file include all candidate data blocks, corresponding to num hash functions of Cuckoo hash, of the migration file; if not, reading candidate data blocks not included in the candidate data blocks corresponding to the num hash functions of Cuckoo hash read for the target file;
(S5.2) initializing the value of a loop variable j to 2;
(S5.3) determining a target position, corresponding to a $j^{th}$ candidate data block, in the hash table of the directory according to a hash calculation result obtained by performing hash calculation on the filename filename of the target file according to a $j^{th}$ hash function of Cuckoo hash; if the target position is vacant, writing metadata information of the migration file and the hash calculation result to the vacant position, and ending the process; otherwise, increasing the value of the loop variable j by 1; if the value of the loop variable j is greater than the total number num of the hash functions, performing the next step; otherwise, performing step (S5.3); and
(S5.4) triggering a migration to migrate metadata of the migration file at the position, corresponding to the $(j-1)^{th}$ candidate data block, in the hash table to form a vacant position, and writing the hash calculation result of the migration file to the vacant position; and performing step (S5.1) using the migration file migrated from the position, corresponding to the $(j-1)^{th}$ candidate data block, in the hash table as a new migration file.

Optionally, after step (S4) and before step (S5), the directory management method further comprises: initializing the number of migrations in a counter c to 1; and triggering a migration to migrate metadata of the migration file at the position, corresponding to the candidate data block, in the hash table to form a vacant position in step (S5.4) further comprises: increasing the number of migrations in the counter c by 1 when the migration is triggered to migrate metadata of the migration file at the position, corresponding to the $j^{th}$ candidate data block, in the hash table to form the vacant position; and updating a mean value m of the number of migrations involved in recent file creation according to the number of migrations in the counter c by formula $m=m(1-\alpha)+\alpha c$ when the metadata information of the target file or the migration file and the hash calculation result are written into the vacant position, where c is the number of migrations, and $\alpha$ is a constant coefficient which is greater than 0 and less than 1; reading candidate data blocks corresponding to num hash functions of Cuckoo hash for the target file in step (S2) comprises: determining a first candidate data block corresponding to the hash table of the directory according to a hash calculation result obtained by performing hash calculation on the filename filename of the target file according to a first hash function of Cuckoo hash, and with the first candidate data block as an initial address, successively reading $\lceil m+1 \rceil N$ candidate data block at a time, where m is the mean value of the number of migrations involved in recent file creation, and N is the number of candidate data blocks successively read at a time.

Optionally, the hash table of the directory is stored in a linear address space of a memory.

Optionally, the total number num of the hash functions of Cuckoo hash is 2.

The disclosure further provides a directory management system for a file system based on Cuckoo hash, including a microprocessor and a memory which are connected, wherein the microprocessor is programmed or configured to perform the steps of the directory management method for a file system based on Cuckoo hash, or a computer program which is programmed or configured to implement the directory management method for a file system based on Cuckoo hash is stored in the memory.

The disclosure further provides a computer-readable storage medium, wherein a computer program which is programmed or configured to implement the directory management method for a file system based on Cuckoo hash is stored in the computer-readable storage medium.

Compared with the prior art, the disclosure has the following advantages: to solve the problem that the tree structure adopted by existing file systems to create indexes for large directories does not support concurrent processing, which is the main cause of a file access delay, the disclosure creates indexes for sub-directories or sub-files in each directory by means of a hash table, which is a planar data structure and suitable for concurrent processing, such that the concurrency can be effectively improved, concurrent operations can be realized, a delay introduced to the critical file access path is small, concurrent operations can be realized, and data access of an application to a large directory can be remarkably accelerated.

DESCRIPTION OF THE EMBODIMENTS

Figure 2:
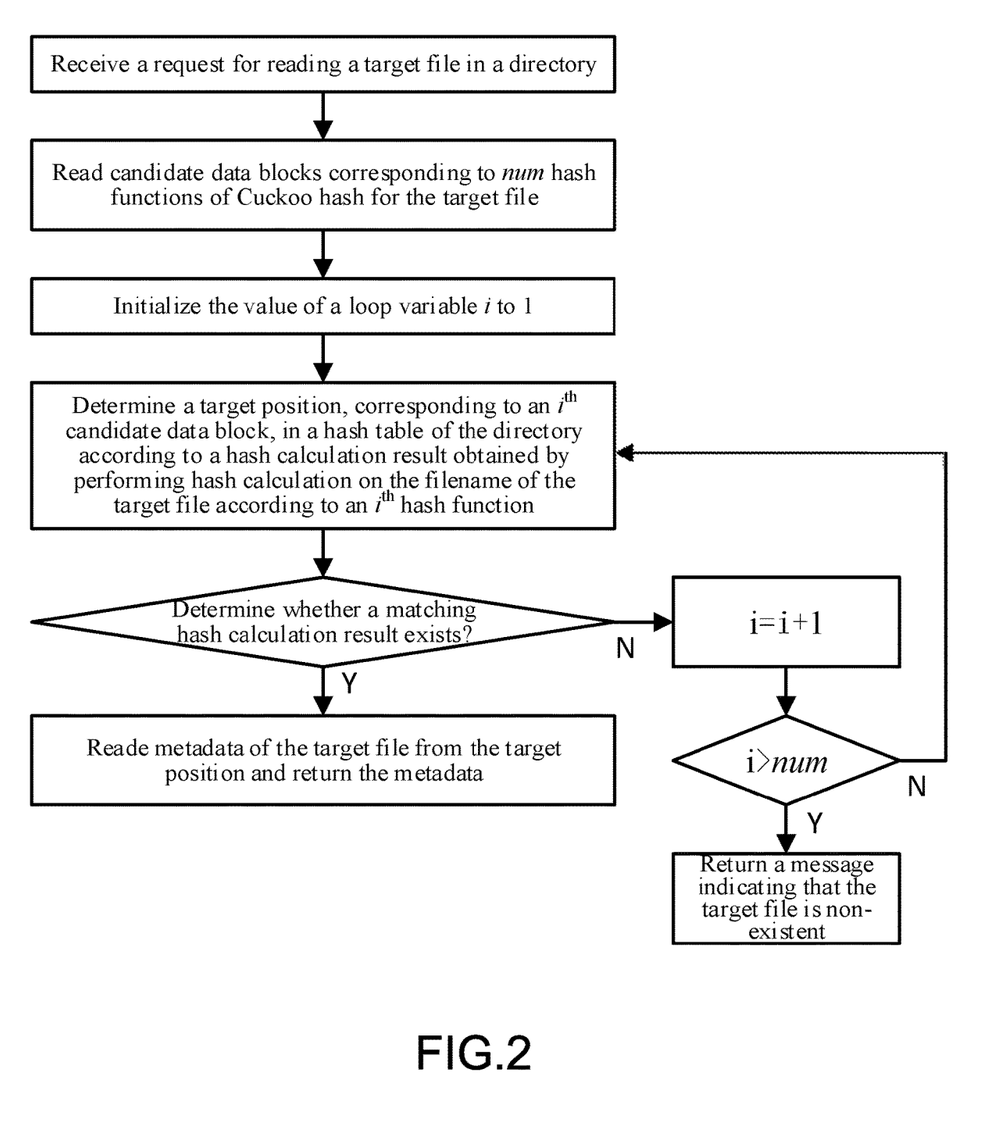
FIG. 2 is a flow diagram of reading metadata of a target file in a directory according to one embodiment of the disclosure.

As shown in FIG. 2, one embodiment provides a directory management method for a file system based on Cuckoo hash, which includes the step of reading metadata of a sub-directory or sub-file, used as a target file, in a directory:

(1) receiving a request for reading the target file in the directory;
(2) reading candidate data blocks corresponding to num hash functions of Cuckoo hash for the target file;
(3) initializing the value of a loop variable i to 1;
(4) for the target file, determining a target position, corresponding to an $i^{th}$ candidate data block, in a hash table of the directory according to a hash calculation result obtained by performing hash calculation on a filename filename of the target file according to an $i^{th}$ hash function of Cuckoo hash, and determining whether a matching hash calculation result exists at the target position; if so, directly reading the metadata of the target file from the target position and returning the metadata, and ending the process; otherwise, increasing the loop variable i by 1; if the value of the loop variable i is greater than the total number num of the hash functions, performing the next step; otherwise, performing step (4); and
(5) returning a message indicating that the target file is non-existent, and ending the process.

Considering that the candidate data blocks corresponding to the num hash functions may involve multiple reading operations, to reduce the number of reading operations, reading candidate data blocks corresponding to num hash functions of Cuckoo hash for the target file in step (2) includes: determining a first candidate data block corresponding to the hash table of the directory according to a hash calculation result obtained by performing hash calculation on the filename filename of the target file according to the first hash function of Cuckoo hash, and with the first candidate data block as an initial address, successively reading N candidate data blocks that include all the candidate data blocks corresponding to the num hash functions of Cuckoo hash at a time, wherein N is the number of the candidate data blocks successively read at a time. By successively reading N candidate data blocks at a time, the number of reading operations is effectively reduced.

To further reduce the number of corresponding reading and writing operations involved in each file access, in this embodiment, two hash functions are ingeniously designed. Specifically, for a specific entry x, it is guaranteed that two corresponding hash values $h_1(x)$ and $h_2(x)$ are close to each other in this embodiment, which means that two candidate positions, corresponding to the entry x, on a storage device are adjacent to each other. Under this precondition, data at the two candidate positions can be read synchronously through a long reading operation, and similarly, data at the two candidate positions can be written into the storage device synchronously through a long writing operation. Through this optimization measure, reading and writing operations required by each file access can be remarkably reduced, but a larger amount of data needs to be read or written each time. Researches show that reading or writing more data each time will not greatly increase extra expenditure. Existing external storage devices mainly include disks and solid state drives (SSDs). For disks, the expenditure of a long data reading/writing operation is similar to the expenditure of a short data reading/writing operation because the main expenditure of data reading/writing of the disks is the seek delay and the rotational delay, which can be reduced by reducing the number of reading/writing operations. So, this embodiment can improve the access performance of large directories on disks. For SSDs which are highly concurrently, a long reading/writing request can be completed by several concurrent channels, so a large delay will not be introduced. To sum up, the optimization measure of replacing two short reading/writing requests with one long reading/writing request proposed in this embodiment is effective to both disks and SSDs. In this embodiment, a calculation function expression of the first hash function of the num hash functions of Cuckoo hash is $h(x)=\text{hash}(x)$, where hash is a preset hash value calculation function, and x is the filename filename of the target file; an calculation function expression of the $i^{th}$ hash function in the other hash functions is:

$$h_i(x)=h_{i-1}(x)+\text{neatest\_prime}(h(x)\%N).$$

Where, $h_i(x)$ denotes the hash calculation result of the $i^{th}$ hash function, $h_{i-1}(x)$ denotes the hash calculation result of the $(i-1)^{th}$ hash function, neatest_prime(h(x)%N) denotes the calculation of a maximum prime number less than h(x)%N (a better stochastic effect will be realized by introducing the prime number), h(x) is the calculation result of the first hash function, % denotes a modulo operation, and N is the number of the candidate data blocks successively read at a time. In this embodiment, by reasonably designing two hash functions to make them close enough, data reading/writing at positions corresponding to the two hash functions can be completed by one reading/writing operation, thus reducing the number of reading/writing operations.

As can be known from the above description, the first hash function is not specially designed, and the corresponding hash value can be calculated through a common hash function according to the filename. To ensure that the second hash value is close to the first hash value, the second hash value may be obtained by adding a small random number to the first hash value to make the mapping positions of different hash functions of the same target file close to each other, which can effectively improve the reading efficiency. Based on the further optimal design, the number of reading/writing operations required for accessing files in large directories can be analyzed again. When one file in a large directory is read, two potential positions corresponding to the target file can be read synchronously through one reading operation. When a file is created in a large directory, there are three possible cases: (1) assume an entry is successfully inserted according to the first hash value, the file creation involves one reading operation and one writing operation; (2) assume an entry fails to be inserted according to the first hash function and is successfully inserted according to the second hash function, the file creation involves one reading operation and one writing operation, which is the same as the first case; (3) if the positions that the two hash functions point are both occupied, a migration will be initiated; because the two candidate positions of any file are close to each other, a target position obtained by the migration is still in the vicinity of the current position, so in this case, the reading/write request can be further increased by adjusting the magnitude of the reading/writing operation, to ensure that the file can be created through one reading operation and one writing operation. By adopting the optimization measure of the disclosure, a file can be read from a large directory through one reading operation, and a file can be created in a large directory through one reading operation and one writing operation, so the file access expenditure is drastically reduced.

Figure 3:
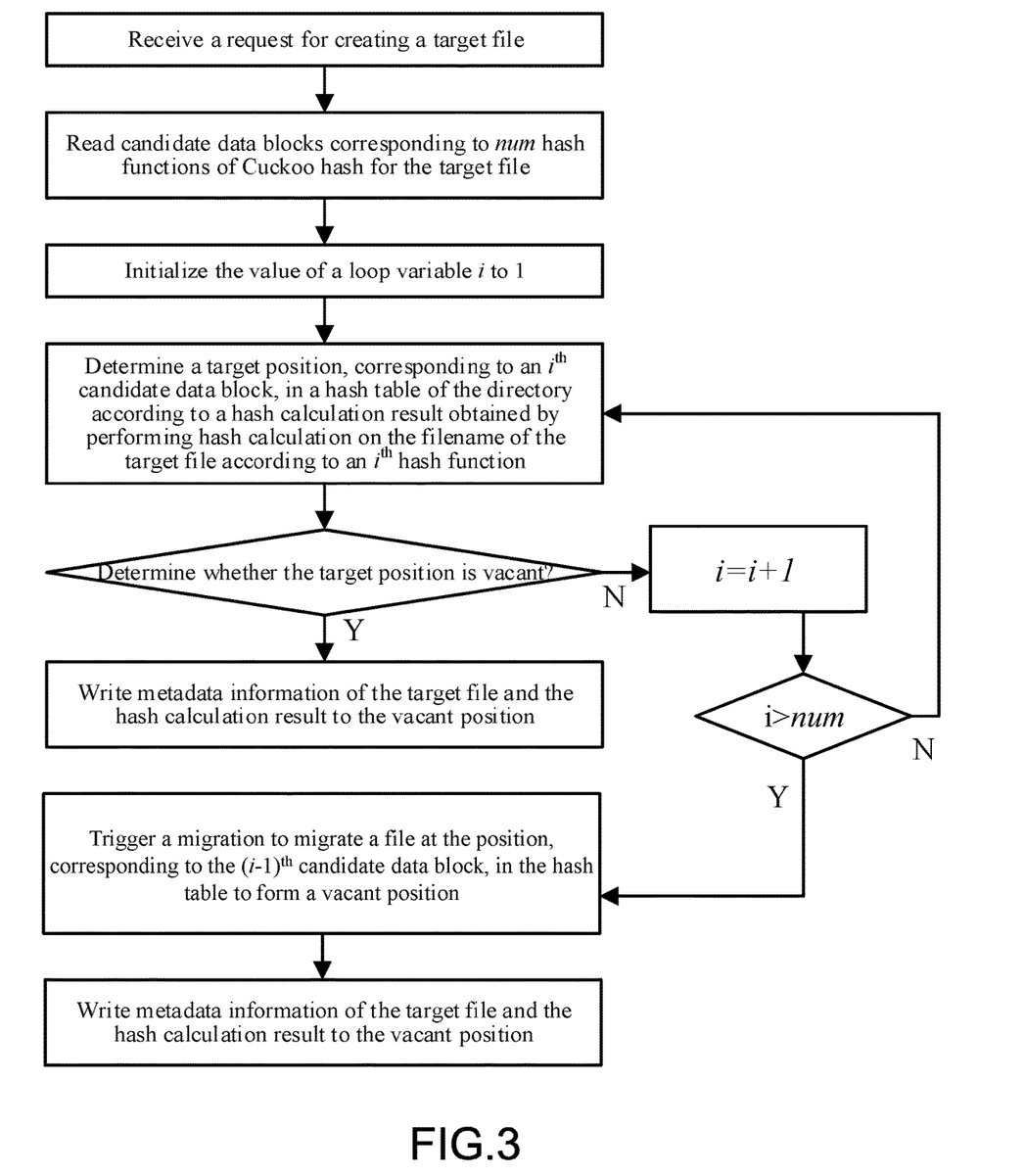
FIG. 3 is a flow diagram of creating a target file in a directory according to one embodiment of the disclosure.

As shown in FIG. 3, the directory management method in this embodiment further includes the step of creating a sub-directory or a sub-file, used as a target file, in a directory:

(S1) receiving a request for creating the target file;

(S2) reading candidate data blocks corresponding to num hash functions of Cuckoo hash for the target file;

(S3) initializing the value of a loop variable i to 1;

(S4) for the target file, determining a target position, corresponding to an $i^{th}$ candidate data block, in a hash table of the directory according to a hash calculation result obtained by performing hash calculation on a filename filename of the target file according to an $i^{th}$ hash function of Cuckoo hash; if the target position is vacant, writing metadata information of the target file and the hash calculation result to the vacant position, and ending the process; otherwise, increasing the loop variable i by 1; if the value of the loop variable i is greater than the total number num of the hash functions, performing step (S5); otherwise, performing step (S4); and (S5) triggering a migration to migrate metadata of a migration file at the position, corresponding to the $(i-1)^{th}$ candidate data block, in the hash table to form a vacant position, and writing metadata information of the target file and the hash calculation result to the vacant position.

Figure 4:
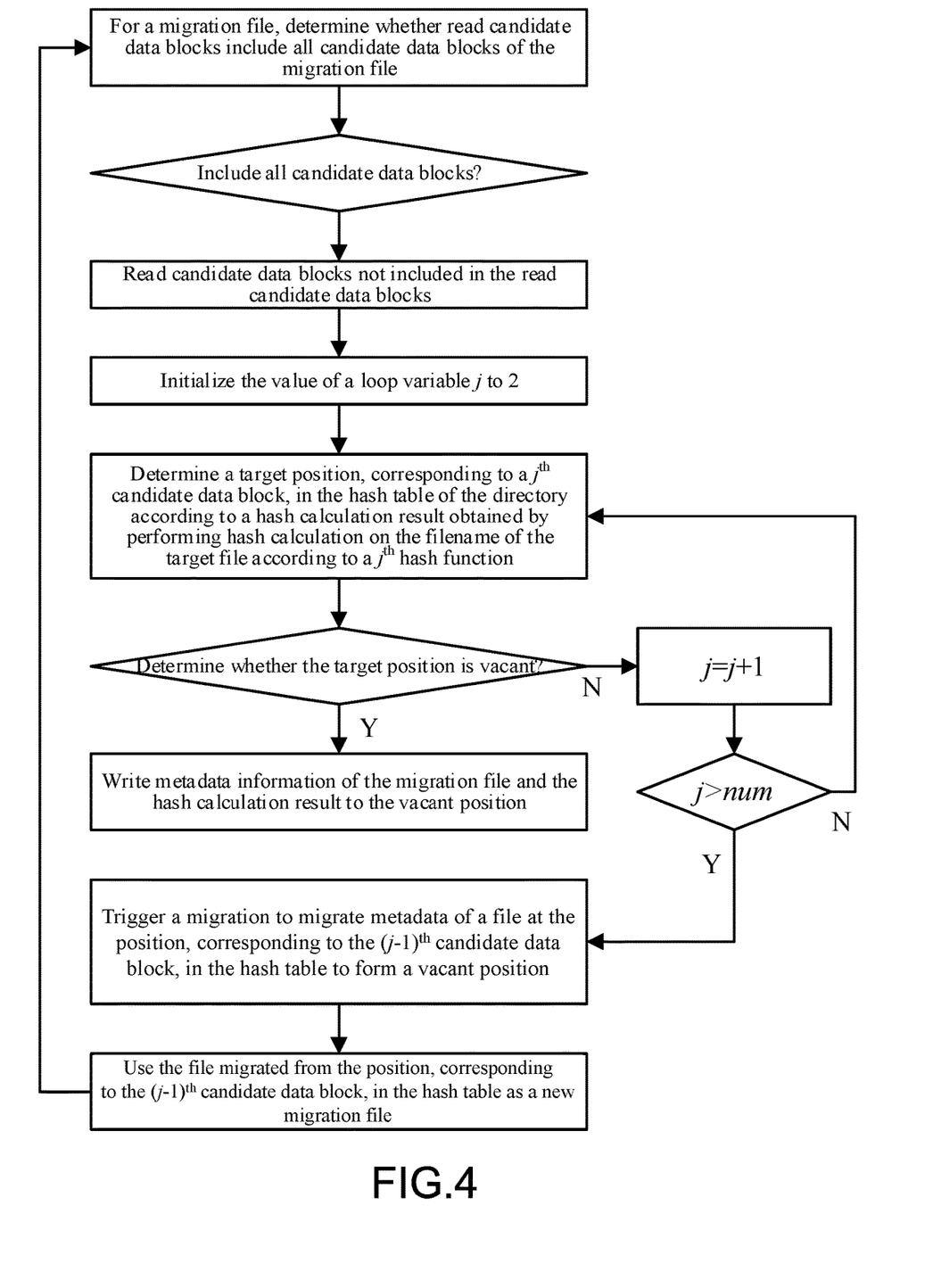
FIG. 4 is a state diagram before an entry a with a hash conflict is inserted according to one embodiment of the disclosure.
Figure 5:
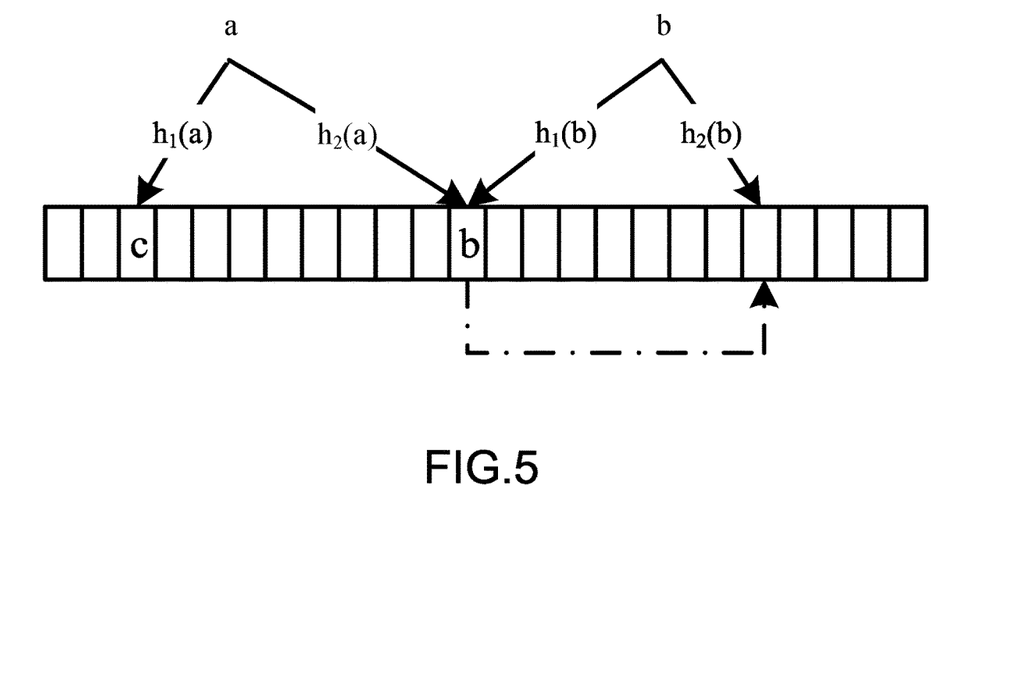
FIG. 5 is a state diagram after the entry a with a hash conflict is inserted according to one embodiment of the disclosure.
Figure 6:
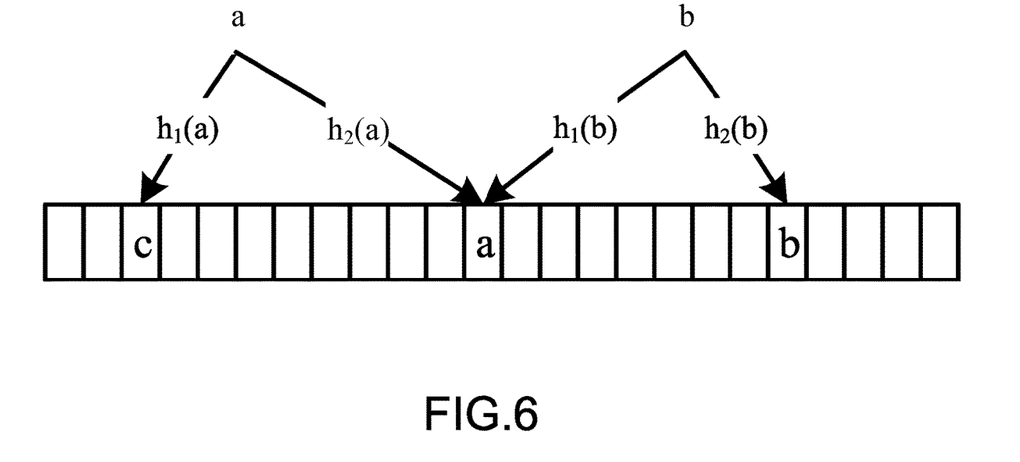
FIG. 6 is a flow diagram of migrating a migration file according to one embodiment of the disclosure.

The hash conflict will be inevitable when the hash table is used, and in order to buffer the hash conflict, Cuckoo hash is used to create indexes for directories in the disclosure. Different from traditional hash tables, Cuckoo hash adopts multiple hash functions, and correspondingly, each entry to be inserted into the hash table has multiple candidate positions. With a Cuckoo hash table with two hash functions as an example, as shown in FIG. 5, the hash table has a large number of storage cells, and an entry a has two candidate positions $h_1(a)$ and $h_2(a)$, where $h_1$ and $h_2$ are the two hash functions used by the Cuckoo hash table. To insert the entry a into the hash table, a is tentatively inserted into the first candidate position $h_1(a)$ first, and if $h_1(a)$ is vacant, a can be directly inserted into $h_1(a)$. However, as shown in FIG. 5, the candidate position $h_1(a)$ has been occupied by an entry c due to the hash conflict, and in this case, a can be tentatively inserted into the second candidate position $h_2(a)$, and if $h_2(a)$ is not occupied, a can be directly inserted into $h_2(a)$. However, as shown in FIG. 5, $h_2(a)$ has been occupied by an entry b, which means that the two candidate positions of a are both occupied by other entries; in this case, the entry b at $h_2(a)$ can be migrated to $h_2(b)$ to vacate $h_2(a)$, such that the entry a can be inserted into the hash table. Because the entry b also has two candidate positions $h_2(a)$ (which has a hash conflict $h_2(a)=h_1(b)$) and $h_2(b)$, this method is feasible. The final state of the hash table obtained after b is migrated and a is inserted is shown in FIG. 6. Cuckoo hash ensures that the complexity of all operations performed on the hash table is constant complexity and can solve the problem of hash conflicts. With Cuckoo hash using two hash functions as an example, two positions of the hash table will be read at most for a query operation. In case of an insertion operation, the hash table may be accessed multiple times because an existent entry needs to be migrated. However, the times of access to the hash table caused by the insertion operation can be controlled as long as the hash table has a certain number of vacant positions. To sum up, the disclosure uses Cuckoo hash to create indexes for sub-directories and sub-files in each large directory, such that the number of reading/writing operations performed on a storage device when a file in the large directory is accessed can be greatly reduced. Based on this design, 1.5 reading operations are needed to access an existent file in a large directory, that is, the position that the first hash function points is read first, and the probability that the target file is saved at this position is only 50%, which indicates that there is a 50% change to read the position that the second hash function points. When a file is created in a large directory, there are three possible cases: (1) assume an entry is successfully inserted according to the first hash function, the file creation involves one reading operation and one writing operation; (2) assume an entry fails to be inserted according to the first hash function and is successfully inserted according to the second hash function, the file creation involves two reading operations and one writing operation; (3) if the positions that the two hash functions point are both occupied, a migration will be triggered; assume n migrations are triggered, the file creation involves (n+2) reading operations and (n+1) writing operations. Each file access still involves multiple reading and writing operations.

When the migration is triggered to migrate the metadata of the migration file at the position, corresponding to the $i^{th}$ candidate data block, in the hash table, a chain of migrations may be formed. A migration may be triggered in case of a conflict of Cuckoo hash. To ensure that a file can be created through one reading operation and one writing operation in presence of a migration, in this embodiment, a mean value of the number of migrations triggered by recent file creation is recorded, the magnitude of the reading/writing request is adjusted dynamically to replace multiple small reading/writing requests with a large reading/writing request to the maximum extent, so as to further reduce the number of reading/writing operations. In this embodiment, migrating metadata of a migration file at the position, corresponding to the $i^{th}$ candidate data block, in the hash table in step (S5) includes:

(S5.1) for the migration file, determining whether the candidate data blocks corresponding to the num hash functions of Cuckoo hash read for the target file include all candidate data blocks, corresponding to the num hash functions of Cuckoo hash, of the migration file; if not, reading candidate data blocks not included in the candidate data blocks corresponding to the num hash functions of Cuckoo hash read for the target file;

(S5.2) initializing the value of a loop variable j to 2;

(S5.3) determining a target position, corresponding to a $j^{th}$ candidate data block, in the hash table of the directory according to a hash calculation result obtained by performing hash calculation on the filename filename of the target file according to a $j^{th}$ hash function of Cuckoo hash; if the target position is vacant, writing metadata information of the migration file and the hash calculation result to the vacant position, and ending the process; otherwise, increasing the value of the variable j by 1; if the value of the loop variable j is greater than the total number num of the hash functions, performing the next step; otherwise, performing step (S5.3); and (S5.4) triggering a migration to migrate metadata of a migration file at the position, corresponding to the $(j-1)^{th}$ candidate data block, in the hash table to form a vacant position, and writing the hash calculation result of the migration file to the vacant position; then, performing step (S5.1) using the file migrated from the position, corresponding to the $(j-1)^{th}$ candidate data block, in the hash table as a new migration file.

As can be known from the above analysis, a file can be read through a reading operation with a length of N because data with the length of N can cover two candidate positions of the target file. A file can be created through one reading operation and one writing operation, wherein data at corresponding candidate positions of the file to be created is read from a storage device into an internal memory through the reading operation, the file system creates the file by rewriting data in the internal memory, and rewritten data is written back into the storage device through the writing operation. In this case, the length of the reading operation and the writing operation needs to be determined. Due to the uncertainty of hash conflicts, the number of migrations triggered by file creation is uncertain, which makes it difficult to determine the length of the reading operation and the writing operation during file creation. In view of this, migrations triggered by recent file creation are recorded, a mean value of the number of the migrations is calculated, and then the magnitude of the reading/writing operation corresponding to current file creation is estimated according to the mean value. Specifically, assume the mean value of the number of migrations triggered by recent file creation is m, the magnitude of the reading/writing operation corresponding to the current file creation is (m+1)N, wherein m denotes the amount of data to be read or written for m migrations, and N is the number of candidate data blocks successively read at a time. Specifically, in this embodiment, a counter c is set, and the value of c is set to 0 when a file is created. During the file creation process, the value of c is increased by 1 every time a migration is triggered. After the file is created, the number of migrations involved in this file creation is recorded in c. The mean value m of the number of migrations involved in recent file creation may be calculated by: $m=m(1-\alpha)+\alpha c$, wherein c is the number of migrations, and $\alpha$ is a constant coefficient which is greater than 0 and less than 1. In the disclosure, the number of migrations to be triggered by next file creation is predicted according to m. Because the migrations are caused by hash conflicts, which are mainly related to the vacancy condition of the hash space, the vacancy rate of the hash space is basically constant in a short period of time, so the probability of hash conflicts is stable, and the number of migrations triggered by hash conflicts in each file creation is also basically constant. Thus, the number of migrations to be triggered by next file creation can be predicted according to m. In this embodiment, after step (S4) and before step (S5), the directory management method further includes: initializing the number of migrations in the counter c to 1; and triggering a migration to migrate metadata of the migration file at the position, corresponding to the $(j-1)^{th}$ candidate data block, in the hash table to form a vacant position in step (S5.4) further includes: increasing the number of migrations in the counter c by 1 when the migration is triggered to migrate metadata of the migration file at the position, corresponding to the $j^{th}$ candidate data block, in the hash table to form the vacant position, and updating the mean value m of the number of migrations involved in recent file creation according to the number of migrations in the counter c by formula $m=m(1-\alpha)+\alpha c$ when the metadata information of the target file or the migration file and the hash calculation result are written into the vacant position, wherein c is the number of migrations, and $\alpha$ is a constant coefficient which is greater than 0 and less than 1; reading candidate data blocks corresponding to num hash functions of Cuckoo hash for the target file in step (S2) includes: determining a first candidate data block corresponding to the hash table of the directory according to a hash calculation result obtained by performing hash calculation on the filename filename of the target file according to a first hash function of Cuckoo hash, and with the first candidate data block as an initial address, successively reading $\lceil m+1 \rceil N$ candidate data blocks at a time, wherein m is the mean value of the number of migrations involved in recent file creation, and N is the number of candidate data blocks successively read at a time. Where, $\lceil m+1 \rceil$ refers to the ceiling of m+1.

In this embodiment, the hash table of the directory is stored in a linear address space of a memory, and the linear address space refers to a continuous address space. In this embodiment, metadata of all sub-files or sub-directories in a directory is saved in a continuous logic address space, and it is ensured that a corresponding physical address space is continuous to the maximum extent. In this way, more data can be read or written according to one reading or writing request when a file is read or created. In this embodiment, the continuous address space is divided into a large number of fixed-size blocks, each of which can save multiple files, and these blocks are buckets corresponding to the hash data structure. All files are hashed to corresponding blocks according to their filenames. Because two hash functions are used, each file has two candidate blocks. In this embodiment, when a directory is created, a continuous space with a fixed size is applied for the directory. With the increase of the number of sub-directories or sub-files created in the directory, the hash conflict becomes increasingly severe, and at this moment, a larger continuous address space can be applied to reconstruct the hash data structure, such that the expandability of the directory is guaranteed.

As an optimal implementation, the total number num of the hash functions in Cuckoo hash is 2.

Figure 7:
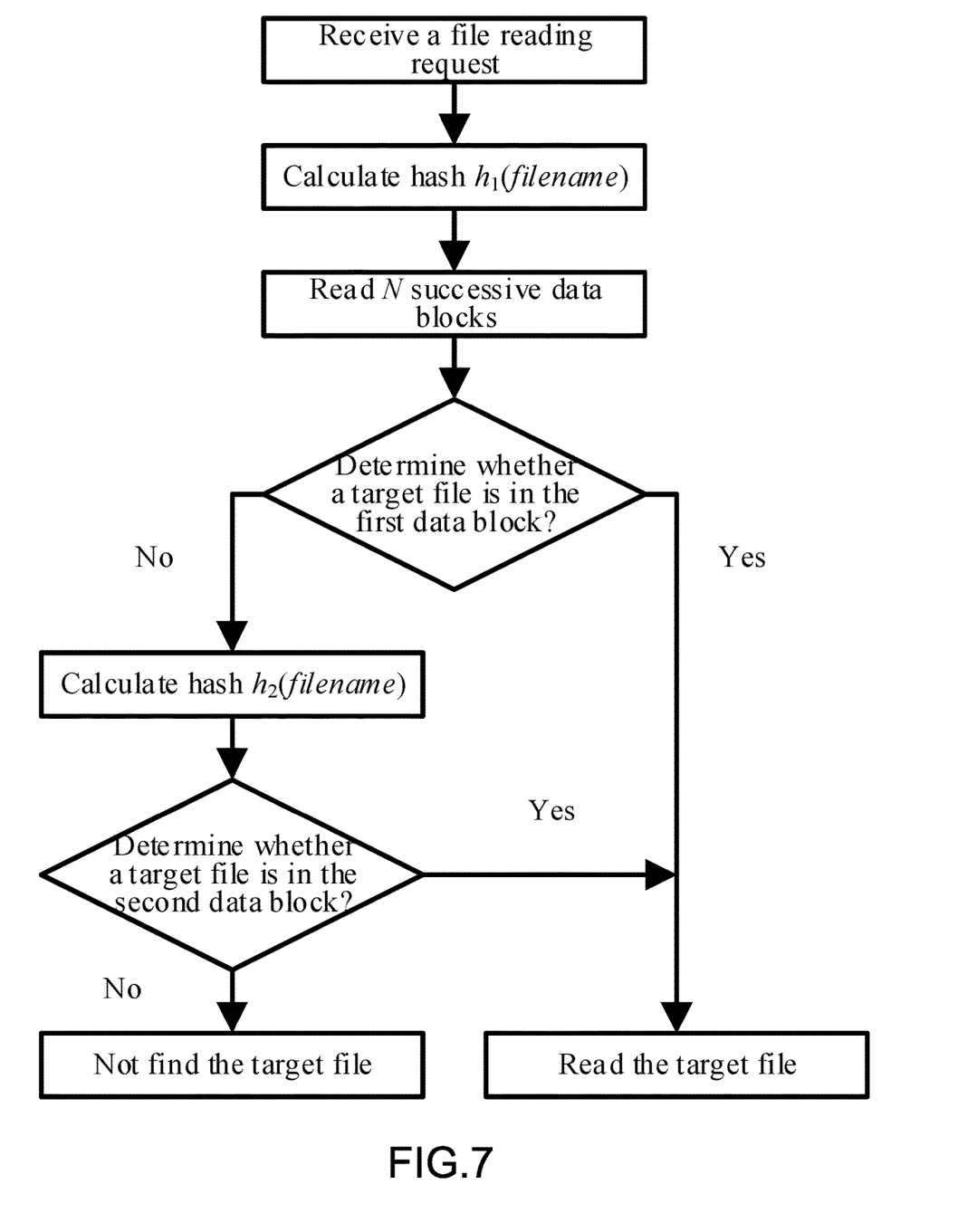
FIG. 7 is a flow diagram of an example of reading metadata of a target file in a directory according to one embodiment of the disclosure.

FIG. 7 illustrates the process of reading a file from a directory in case where the total number num of hash functions is 2: step 1, receiving a request for reading the file filename from an upper-level application, and performing step 2; step 2, performing hash calculation on the file filename by means of a first hash function to determine a corresponding first candidate block of the file in the linear address space, and performing step 3; step 3, with the first candidate block as an initial address, successively reading N data blocks which definitely include a second candidate data block of the file, and performing step 4; step 4: determining, by searching, whether the file filename exists in the first candidate block; if so, performing step 8 to directly read the file; otherwise, performing step 5; step 5, performing hash calculation on the file filename by means of a second hash function to determine a corresponding second candidate block of the file in the linear address space, and performing step 6; step 6, determining, by searching, whether the file filename exists in the second candidate block; if so, performing step 8 to directly read the file; otherwise, performing step 7; and step 7, determining that the file is nonexistent if the file is found in neither of the two candidate blocks. It should be noted that, a reading operation performed on the storage device is involved merely in step 3 in this process, and data used in step 6 has been read from the storage device to the internal memory in step 3, so it is unnecessary to send a reading request in step 6.

Figure 8:
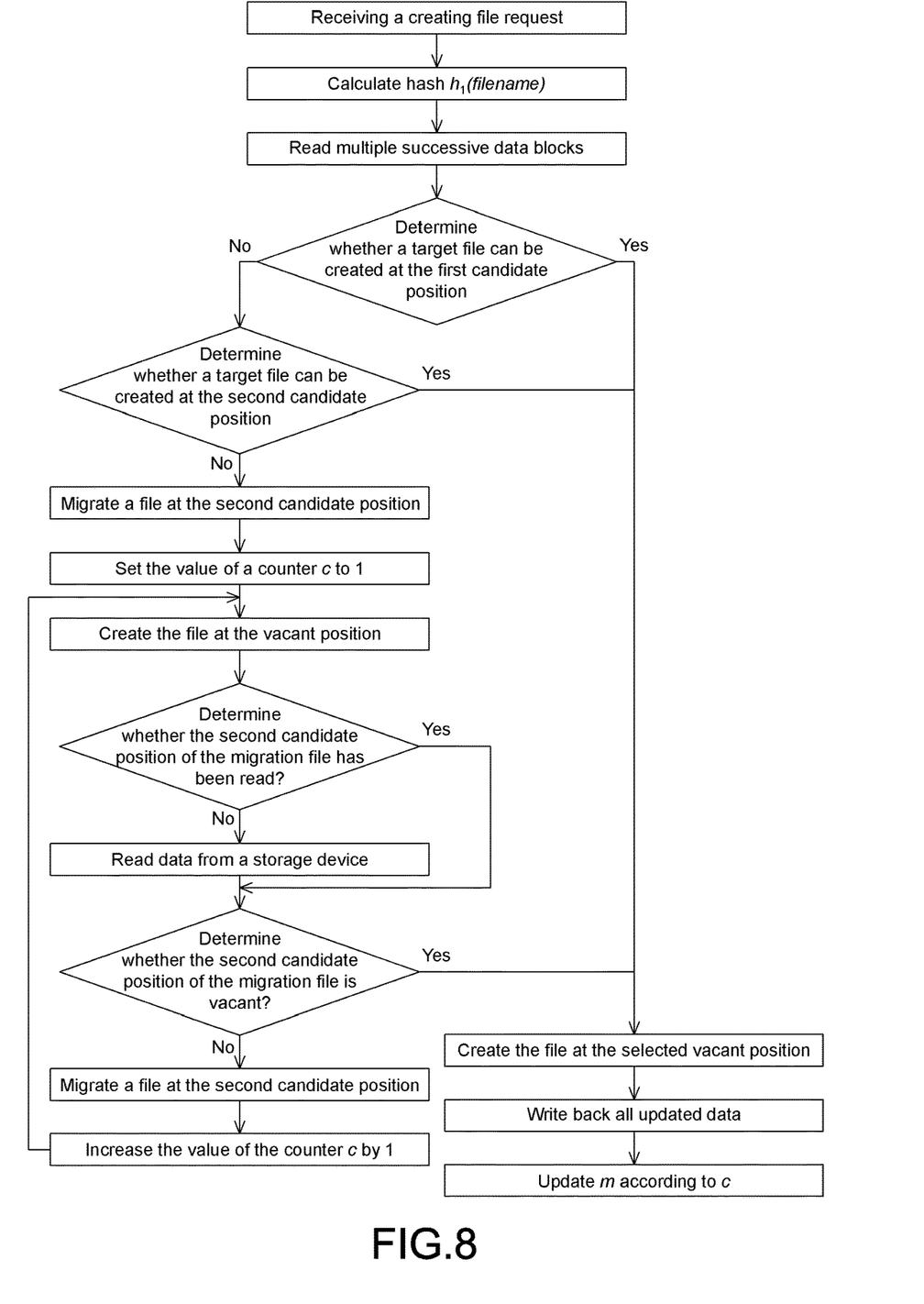
FIG. 8 is a flow diagram of an example of creating a target file in a directory according to one embodiment of the disclosure.

FIG. 8 illustrates the process of creating a file in a large directory in case where the total number num of hash functions is 2: step 1: receiving a request for creating the file filename from an upper-level application, and performing step 2; step 2: performing hash calculation on the file filename by means of a first hash function to determine a corresponding first candidate block of the file in the linear address space, and performing step 3; step 3, with the first candidate block as an initial address, successively reading $\lceil m+1 \rceil N$ data blocks, which definitely include a second candidate data block of the file and even include a data block involving a data migration caused by a hash conflict, and performing step 4; step 4: determining whether the position corresponding to the first candidate block is vacant; if so, directly performing step 14; otherwise, performing step step 5: determining whether the position corresponding to the second candidate block is vacant; if so, directly performing step 14; otherwise, performing step 6; step 6: because neither of the two positions of the file to be created is vacant, triggering a migration to migrate the file at the second candidate position, and performing step 7; step 7, initializing the value of the counter to 1, which indicates that one migration has been performed, and performing step 8; step 8, writing the file to be created to the position which is vacated through the migration in step 7, and performing step 9; step 9: determining whether two candidate positions of the file migrated from the second candidate position have been read into the internal memory from the storage device through the reading operation in step 3; if so, performing step 11; otherwise, performing step 10; step 10, reading the second candidate position of the migration file to the internal memory from the storage device, and performing step 11; step 11, determining whether the second candidate position of the migration file is vacant; if so, directly performing step 14; otherwise, performing step 12; step 12, because the second candidate position of the migration file is not vacant either, performing another migration to migrate the file at the second candidate position, and performing step 13; step 13, increasing the value of the counter c by 1, and performing step 8; step 14, writing the file to be created to the vacant position, wherein the file at the vacant position is a file corresponding to the original request or a migration file; and performing step 15; step 15, writing all data updated in the internal memory back into the storage device to realize data persistence, and performing step 16; and step 16, calculating the mean value m of the number of migrations involved in recent file creation by formula: $m=m(1-\alpha)+\alpha c$, wherein c is the number of migrations, and a is a constant coefficient which is greater than 0 and less than 1. The mean value m of the number of migrations involved in recent file creation can be estimated smoothly through this formula. The number of blocks successively read in step 3 is dynamically adjusted according to the number of migrations required by recent file creation to ensure that all data involved in all migrations can be read into the internal memory through one reading operation to avoid a reading request in step 10, such that the number of reading/writing operations is reduced.

Compared with traditional methods, the directory management method for a file system based on Cuckoo hash in this embodiment adopts two technical means to ensure a small delay when a file is searched for in a large directory. First, in this embodiment, all sub-directories or sub-files in a large directory are saved by means of a hash data structure rather than a hierarchical tree structure. The tree structure cannot realize concurrent operation when a file is searched for because of its hierarchical feature, so the file has to be searched for from the root node to the leaf nodes layer by layer, which will lead to a large delay. In this embodiment, the planar hash data structure supporting concurrent query is used, such that the delay is small when a file is searched for in a large directory. Second, in this embodiment, Cuckoo hash is used to solve the problem of hash conflicts. Cuckoo hash adopts two hash functions, and the values of the two hash functions are close enough in this embodiment, so data blocks corresponding to the two hash values can be read from a storage device to an internal memory through one reading/writing operation. In this way, a file can be read through one reading operation, and a file can be created generally through one reading operation and one writing operation. To sum up, the directory management method for a file system based on Cuckoo hash in this embodiment can drastically reduce the delay caused when a file is searched for or created in a large directory by improving the concurrency and reducing the number of reading/writing operations.

In addition, this embodiment further provides a directory management system for a file system based on Cuckoo hash, which includes a microprocessor and a memory which are connected, wherein the microprocessor is programmed or configured to perform the steps of the directory management method for a file system based on Cuckoo hash, or a computer program which is programmed or configured to implement the directory management method for a file system based on Cuckoo hash is stored in the memory.

In addition, this embodiment further provides a computer-readable storage medium, wherein a computer program which is programmed or configured to implement the directory management method for a file system based on Cuckoo hash is stored in the computer-readable storage medium.

Those skilled in the art would appreciate that the embodiments of the application can be provided as a method, a device or a computer program product. So, the embodiments of the application may be completely hardware embodiments, completely software embodiments, or embodiments combining software and hardware. In addition, the embodiments of the application may be in the form of a computer program product to be implemented on one or more computer-available storage media (including, but not limited to, a disk memory, a CD-ROM, an optical memory, and the like) including computer-available program codes. The application is described with reference to the flow diagram and/or block diagram of the method, equipment (system) and computer program product provided by the embodiments of the application. It should be understood that each process and/or block in the flow diagram and/or block diagram and the combinations of processes and/or blocks in the flow diagram and/or block diagram can be implemented by computer program instructions. These computer program instructions can be configured in a general-purpose computer, a special-purpose computer, an embedded processor, or a processor of other programmable data processing terminals to create a machine, so that the instructions can be executed by the computer or the processor of other programmable data processing equipment to create a device for realizing specific functions in one or more processes in the flow diagram and/or in one or more blocks in the block diagram. These computer program instructions may also be stored in a computer-readable memory that can guide the computer or other program data processing equipment to work in a specific manner, so that the instructions stored in the computer-readable memory can create a product including an instruction device, and the instruction device implements specific functions in one or more processes of the flow diagram and/or one or more blocks in the block diagram. These computer program instructions may also be loaded on a computer or other programmable data processing equipment, so that the computer or other programmable equipment can perform a series of operation steps to carry out processing realized by the computer, and the instructions are executed on the computer or other programmable equipment to realize specific functions in one or more processes in the flow diagram and/or one or more block diagrams in the block diagram.

The above embodiments are merely preferred ones of the disclosure and are not used to limit the protection scope of the disclosure, and all technical solutions based on the concept of the disclosure should fall within the protection scope of the disclosure. It should be pointed out that those ordinarily skilled in the art can make some improvements and embellishments without departing from the principle of the disclosure, and all these improvements and embellishments should also fall within the protection scope of the disclosure.

What is claimed is:

1. A directory management method for a file system based on Cuckoo hash, comprising a process of reading metadata of a sub-directory or a sub-file, used as a target file, in a directory, wherein a hash table of the directory is stored in a linear address space of a memory, the hash table has a plurality of storage cells, and the process comprises following steps:
   (1) receiving a request for reading the target file in the directory;
   (2) reading, from the plurality of storage cells, candidate data blocks corresponding to num hash functions of Cuckoo hash for the target file, comprising: determining a first candidate data block corresponding to the hash table of the directory according to a hash calculation result obtained by performing hash calculation on the filename filename of the target file according to a first hash function of Cuckoo hash, and with the first candidate data block as an initial address, successively reading N candidate data blocks that include the candidate data blocks corresponding to the num hash functions of Cuckoo hash at a time, wherein N is the number of candidate data blocks successively read at a time;
   (3) initializing a value of a loop variable i to 1;
   (4) for the target file, determining a target position, corresponding to an $i^{th}$ candidate data block, in the hash table of the directory according to a hash calculation result obtained by performing hash calculation on a filename filename of the target file according to an $i^{th}$ hash function of Cuckoo hash; determining whether a matching hash calculation result exists at the target position; if so, directly reading metadata of the target file from the target position of the plurality of storage cells and returning the metadata, and ending the process; otherwise, increasing the value of the loop variable i by 1; and
   (5) if the value of the loop variable i is greater than a total number num of the hash functions, returning a message indicating that the target file is non-existent, and ending the process; otherwise, performing step (4), wherein in the num hash functions of Cuckoo hash, a calculation function expression of the first hash function is $h(x)=hash(x)$, where hash is a preset hash value calculation function, and x is the filename filename of the target file; a calculation function expression of the $i^{th}$ hash function is:

$$h_i(x)=h_{i-1}(x)+\text{neatest\_prime}(h(x)\%N)$$

where, $h_i(x)$ denotes a hash calculation result of the $i^{th}$ hash function, $h_{i-1}(x)$ denotes a hash calculation result of the $(i-1)^{th}$ hash function, $\text{neatest\_prime}(h(x)\%N)$ denotes the calculation of a maximum prime number less than $h(x)\%N$, $h(x)$ is a calculation result of the first hash function, % denotes a modulo operation, and N is the number of candidate data blocks successively read at a time.

2. The directory management method for a file system based on Cuckoo hash according to claim 1, further comprising a process of creating a sub-directory or a sub-file, used as target file, in a directory, the process comprising following steps:
   (S1) receiving a request for creating the target file;
   (S2) reading candidate data blocks corresponding to the num hash functions of Cuckoo hash for the target file;
   (S3) initializing the value of the loop variable i to 1;
   (S4) for the target file, determining the target position, corresponding to the $i^{th}$ candidate data block, in the hash table of the directory according to the hash calculation result obtained by performing the hash calculation on the filename filename of the target file according to the $i^{th}$ hash function of Cuckoo hash; if the target position is a vacant position, writing metadata information of the target file and the hash calculation result to the vacant position, and ending the process; otherwise, increasing the value of the loop variable i by 1; if the value of the loop variable i is greater than the total number num of the hash functions, performing step (S5); otherwise, performing step (S4); and
   (S5) triggering a migration to migrate a migration file at a position, corresponding to the $(i-1)^{th}$ candidate data block, in the hash table to form a vacant position, and writing the metadata information of the target file and the hash calculation result to the vacant position.

3. The directory management method for a file system based on Cuckoo hash according to claim 2, wherein migrating the migration file at the position, corresponding to the $(i-1)^{th}$ candidate data block, in the hash table in step (S5) comprises:
- (S5.1) for the migration file, determining whether the candidate data blocks corresponding to the num hash functions of Cuckoo hash read for the target file include all candidate data blocks, corresponding to num hash functions of Cuckoo hash, of the migration file; if not, reading candidate data blocks not included in the candidate data blocks corresponding to the num hash functions of Cuckoo hash read for the target file;
- (S5.2) initializing a value of a loop variable j to 2;
- (S5.3) determining a target position, corresponding to a $j^{th}$ candidate data block, in the hash table of the directory according to a hash calculation result obtained by performing hash calculation on the filename filename of the target file according to a $j^{th}$ hash function of Cuckoo hash; if the target position is a vacant position, writing metadata information of the migration file and the hash calculation result to the vacant position, and ending the step (S5); otherwise, increasing the value of the loop variable j by 1; if the value of the loop variable j is greater than the total number num of the hash functions, performing a next step; otherwise, performing step (S5.3); and
- (S5.4) triggering a migration to migrate metadata of the migration file at a position, corresponding to the $(j-1)^{th}$ candidate data block, in the hash table to form a vacant position, and writing the hash calculation result of the migration file to the vacant position; and performing step (S5.1) using the migration file migrated from the position, corresponding to the $(j-1)^{th}$ candidate data block, in the hash table as a new migration file.

4. The directory management method for a file system based on Cuckoo hash according to claim 3, wherein after step (S4) and before step (S5), the directory management method further comprises: initializing the number of migrations in a counter c to 1; and triggering the migration to migrate metadata of the migration file at the position, corresponding to the $(j-1)^{th}$ candidate data block, in the hash table to form the vacant position in step (S5.4) further comprises: increasing the number of migrations in the counter c by 1; and when the metadata information of the target file or the migration file and the hash calculation result are written into the vacant position, updating a mean value m of the number of migrations involved in recent file creation according to the number of migrations in the counter c by formula $m=m(1-\alpha)+\alpha c$, where c is the number of migrations, and $\alpha$ is a constant coefficient which is greater than 0 and less than 1; reading the candidate data blocks corresponding to the num hash functions of Cuckoo hash for the target file in step (S2) comprises: determining a first candidate data block corresponding to the hash table of the directory according to a hash calculation result obtained by performing hash calculation on the filename filename of the target file according to a first hash function of Cuckoo hash, and with the first candidate data block as an initial address, successively reading $\lceil m+1 \rceil N$ candidate data block at a time, where m is the mean value of the number of migrations involved in recent file creation, and N is the number of candidate data blocks successively read at a time.

5. The directory management method for a file system based on Cuckoo hash according to claim 1, wherein the total number num of the hash functions of Cuckoo hash is 2.

* * * * *